Nov. 21, 1967   N. L. MADISON   3,354,211
COPOLYMERIZATION OF NF COMPOUND AND FORMALDEHYDE
Filed Nov. 1, 1963
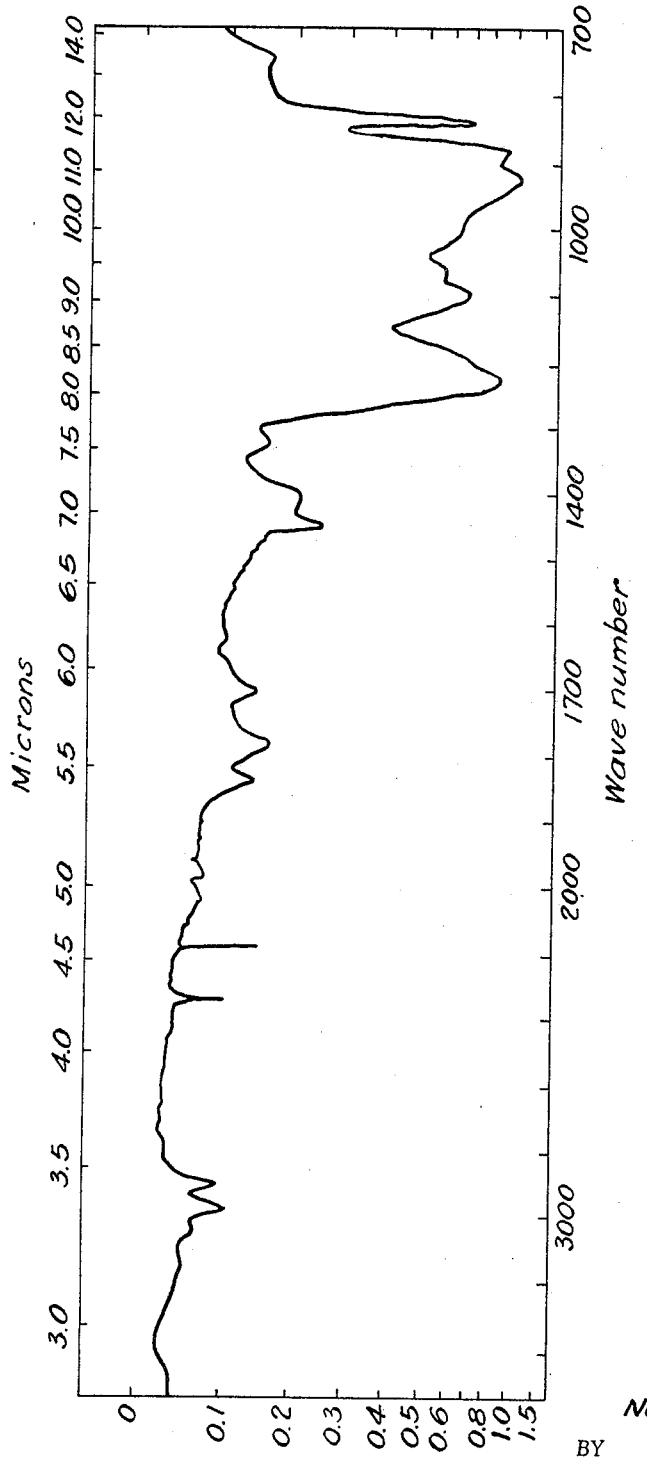
INVENTOR.
*Norman L. Madison*
BY
*C. Kenneth Bjork*
AGENT

United States Patent Office 3,354,211
Patented Nov. 21, 1967

3,354,211
COPOLYMERIZATION OF NF COMPOUND AND FORMALDEHYDE
Norman L. Madison, Midland, Mich., assignor to The Dow Chemical Company, Midland, Mich., a corporation of Delaware
Filed Nov. 1, 1963, Ser. No. 321,391
7 Claims. (Cl. 260—564)

This invention relates to copolymers of organic fluorine and nitrogen substituted compounds with formaldehyde and more particularly is concerned with a novel process for preparing copolymers of perfluoroguanidine and formaldehyde corresponding to the structural formula $[(NF_2)_2CNF(CH_2O)_y]_x$ where $y$ is an integer ranging from about 1 to about 6 or more and $x$ is an integer greater than 1.

The figure presents the infrared spectrum of a perfluoroguanidine-formaldehyde copolymer having a perfluoroguanidine/formaldehyde ratio of about 1.

The present polymer is suitable for use as an oxidizer, binder or plasticizer for rocket propellants.

In accordance with the present process, formaldehyde is reacted with perfluoroguanidine, $(NF_2)_2CNF$, hereinafter designated as PFG, at a $CH_2O/PFG$ gram-mole ratio of about 1 to 1 in the presence of from about 2 to about 10 weight percent (based on the total mix) of a cesium fluoride or rubidium fluoride catalyst at a maximum temperature of about minus 20° C. for a period of at least several hours. By this novel process, undesirable side reactions are substantially completely eliminated.

Preferably in preparing the polymeric product, about equimolar quantities of high purity PFG and high purity formaldehyde are reacted at a maximum temperature of about minus 40° C. in the presence of about 5 percent by weight (based on total mix) of a cesium fluoride catalyst for a period of from about 12 to about 48 hours.

The product can be recovered from the reaction mixture by extraction with a suitable solvent e.g. a fluorinated aliphatic halocarbon having a carbon chain length of from 1 to about 2 such as trichlorofluoromethane, 1,1,2-trichloro-1,2,2-trifluoroethane, dichlorofluoromethane, 1,2-difluoro-tetrachloroethane, and the like.

The resulting product ranges in physical appearance from almost a fluid to a tacky or rubbery solid depending on the reaction conditions and gram-mole ratio of the PFG and formaldehyde reactants.

Propellant compositions of aluminum (4–22 parts by weight), triaminoguanidinium azide (0 to 30 parts by weight), ammonium perchlorate (23 to 54 parts by weight) and the present copolymer having a $PFG/CH_2O$ mole ratio of about 1 (30 to 50 parts by weight) exhibited calculated specific impulses of from 271 to about 290 sec.

With a ½ $PFG/CH_2O$ mol ratio copolymer corresponding to the empirical formula $[(NF_2)_2CNF(CH_2O)_2]_x$, propellants containing from 30 to 80 parts by weight of the polymer, 0 to 22 parts by weight aluminum and 15 to 48 parts by weight ammonium perchlorate have a calculated specific impulse of from about 271 to 298.

Even higher specific impulses are realized for propellants comprised of from about 60 to 80 parts by weight the polymer produced by the present invention, 0 to 10 parts by weight aluminum, and 10 to 36 parts by weight hydrazinium nitroformate. Similarly, beryllium containing propellants which include the present copolymer also provide specific impulses higher than 325 sec. For example compositions containing from 40 to 80 parts by weight of the copolymer, 12 to 30 parts by weight beryllium, 0 to 5 parts by weight triaminoguanidinum azide and 4 to 38 parts by weight ammonium perchlorate have calculated specific impulses ranging from 278 to about 328 sec.

These propellant compositions are given merely to illustrate the utility of the present copolymer and are not meant to be limiting.

The following examples will serve to illustrate further the present invention but are not meant to limit it thereto.

*Example 1.*—About 0.1 gram of CsF was placed in a 0.3 cubic centimeter needle-valve, Swagelok sealed glass tube. The tube was heated for about two hours under a pressure of about 0.001 millimeter mercury absolute at about 500°–600° C. to remove substantially all traces of moisture from the catalyst. After this period about 117 milligrams (~0.785 millimole) of perfluoroguanidine, prepurified by vapor phase chromatography, was condensed into the tube. About 24.1 milligrams (~0.8 millimole) of monomeric formaldehyde was condensed over the perfluoroguanidine. The needle-valve of the assembly was closed and the reaction vessel was placed in a freezer, thermostatically controlled at about minus 43° C. After about 48 hours, the vessel was removed from the freezer, cooled in a Dry Ice bath and connected to a low pressure vacuum line. Volatiles were removed by expansion into the low pressure line as the tube warmed to room temperature.

The solid polymer product was extracted with Freon 11 fluorohalocarbon to provide a solution of the $PFG-CH_2O$ copolymer.

The product was characterized by means of a number of analytical techniques.

A sample of the copolymer in the fluorohalocarbon solution was evaporated onto KBr plates. Infrared analysis gave an intense spectrum which was consistent with the structure $[(NF_2)_2CNF(CH_2O)_1]_x$. Absorption bands characteristic of methylene hydrogens were observed at about $3.34\mu$ and $3.42\mu$. NF bands were found in the 10–12$\mu$ region. Additionally, bands in the 9–10$\mu$ region supported the presence of aliphatic ether linkages. The figure shows the infrared spectrum obtained for this product.

Another portion of the Freon 11 fluorohalocarbon solution of the copolymer was analyzed by NMR. This analysis also supported the proposed structure. This analysis showed two lines in the $F^{19}$ spectrum, one at $-23.6$ p.p.m. (with respect to the standard Freon 11 fluorohalocarbon) from $NF_2$ and one at $+71.4$ p.p.m. (with respect to this same standard) from NF. The latter line was weak in the direct $F^{19}$ spectrum because of broadening and dilution. A detailed $F^{19}$ spectrum of the $NF_2$ group showed a possible splitting of approximately 20 c.p.s.

The proton spectrum was essentially a doublet centered at 603 p.p.m. [$(CH_3)_4Si$ as reference] with 39 c.p.s. coupling to NF. This indicated in the polymeric structure of the empirical formula set forth hereinbefore that $y$ is about 1.

Internuclear double resonance spectra of the NF line were obtained by resting on top of one or the other of the proton doublets and sweeping through the $F^{19}$ spectrum while observing the decrease in intensity of the proton line as the NF was traversed. This established the $CH_2$ to NF coupling.

The spectra obtained in the NMR analysis indicated the copolymer was present in the solution at a concentration of about 12 weight percent.

As a control several runs were made at room temperatures and without the catalyst.

Table II summarizes the results obtained for a number of runs.

TABLE II

| Run No. | $PFG/CH_2O$ (mol ratio) | Catalyst | Reaction temp. (° C.) | Reaction time (hours) | Remarks |
|---|---|---|---|---|---|
| 1 | 0.7 | CsF | −43 | 336 | 37% of PFG incorporated into the rubbery shock sensitive polymer. |
| 2 | 0.7 | RbF | −20 | 50 | 30% of PFG incorporated into a solid 1/1 copolymer. |
| 3 | 1.0 | CsF | −43 | 24 | 77% of 99+% purity PFG incorporated into a 1/1 solid copolymer. |
| 4 | 1.0 | CsF | −78 | 24 | 13% of PFG incorporated, reaction run by having $CH_2O$ gas diffuse into PFG with CsF at −78° C. |
| 5 | 2.0 | CsF | −43 | 72 | Elemental analysis, F=32.9% indicated a $PFG/CH_2O$ ratio of 4.5/1. |
| 6 | 1.2 | CsF | −43 | 144 | 44% incorporation of PFG into copolymer, no gaseous side products. Elemental analysis, F=38.0%, or $PFG/CH_2O$=3.4/1. |
| 7 | 1.0 | CsF | −43 | 64 | 39% of PFG incorporated analysis, N=16.77% or $CH_2O/PFG$~3/1. |
| Control Studies: | | | | | |
| 8 | 0.8 | No catalyst | −43 | 96 | 95% recovery of PFG. |
| 9 | 0.8 | RbF | (1) | 18 | Exploded when opened to vacuum line after reaction. |
| 10 | 0.8 | RbF | (1) | 0.25 | Exploded upon warming to room temperature. |

1 Room temperature.

Chemical analysis on the polymeric residue from an evaporated portion of a solution of about 35–40 percent of polymer dissolved in Freon 112 fluorohalocarbon indicated the polymer was primarily a 1 to 1 molar ratio of $PFG/CH_2O$. The results of this analysis are presented in Table I which follows:

TABLE I.—CHEMICAL ANALYSIS OF PFG-FORMALDEHYDE COPOLYMER

| Element | Elemental Analysis, Percent | |
|---|---|---|
| | Theory for 1 to 1 $PFG/CH_2O$ Entities in Polymer | Actual Experimental Product |
| F | 53.0 | 54.3; 53.8 |
| N | 23.45 | 22.5; 22.6 |
| C | 13.40 | 14.0; 14.2 |
| H | 1.12 | 1.88; 1.88 |
| O (by difference) | 8.94 | 7.3; 7.5 |

*Example 2.*—A number of runs were made employing different $PFG/CH_2O$ reactant ratios and reaction conditions. For these studies, from about 10–12 milligrams of a catalyst was dried by heating at from about 200 to about 600° C. for about 1–2 hours under a reduced pressure of about 0.001 millimeter mercury absolute in a 0.3 cubic centimeter Swagelok sealed Pyrex glass ampoule fitted with a needle valve.

Triply distilled, pure monomeric formaldehyde, prepared by cracking paraformaldehyde, was condensed into the ampoule. Perfluoroguanidine also was condensed into the ampoule which had been cooled to about minus 196° C. The so-loaded reactor was sealed and maintained at a predetermined temperature for a period of time.

These reactions generally produced a clear liquid or solid which lost very little PFG when placed under a reduced pressure of about .0001 millimeter mercury absolute for about 20 minutes at room temperature. The product indicated a sensitivity to impact, grinding and sparking.

Various modifications can be made in the present invention without departing from the spirit or scope thereof for it is understood that I limit myself as defined in the appended claims.

I claim:
1. A copolymer of perfluoroguanidine and formaldehyde corresponding to the empirical formula

$$[(NF_2)_2CNF(CH_2O)_y]_x$$

where $y$ is an integer ranging from 1 to about 6 and $x$ is an integer greater than 1.

2. A copolymer of perfluoroguanidine and formaldehyde corresponding to the empirical formula $$[(NF_2)_2CNF(CH_2O)_y]_x$$

where $x$ is an integer greater than 1 and $y$ is 1.

3. A process for preparing copolymers of perfluoroguanidine and formaldehyde having an empirical formula corresponding to $[(NF_2)_2CNF(CH_2O)_y]_x$ where $y$ is an integer ranging from about 1 to about 6 and $x$ is an integer greater than 1 which comprises;
   (a) contacting perfluoroguanidine with formaldehyde at a $CH_2O/(NF_2)_2CNF$ gram mol ratio of about 1 to 1 in the presence of a catalyst selected from the group consisting of cesium fluoride and rubidium fluoride.
   (b) reacting the admixture at a maximum temperature of about minus 20° C. for a period of at least several hours, and
   (c) recovering the $[(NF_2)_2CNF(CH_2O)_y]_x$ polymer from the reaction mass.

4. A process for preparing a copolymer of perfluoroguanidine and formaldehyde having an empirical formula corresponding to $[(NF_2)_2CNF(CH_2O)_y]_x$ where $x$ is an integer greater than 1 and $y$ is 1 which comprises;
   reacting for a period of from about 12 hours to about 48 hours about equimolar quantities of perfluoroguanidine and formaldehyde at a maximum temperature of about minus 40° C. in the presence of about 5 percent by weight, based on the total reaction mass of a catalyst selected from the group consisting of cesium fluoride and rubidium fluoride, and recovering the $[(NF_2)_2CNF(CH_2O)_y]_x$ polymer from the reaction mass.

5. The process as defined in claim 4 wherein the catalyst is cesium fluoride.

6. The process as defined in claim 4 and including the step of heating the catalyst at a temperature of from about 200 to about 600° C. at reduced pressure to dry said catalyst prior to reacting said perfluoroguanidine and said formaldehyde in the presence of said catalyst.

7. The process as defined in claim 4 and including the steps of extracting the product mass with an aliphatic fluorohalocarbon thereby to dissolve said polymer, and recovering the copolymer from the halofluorocarbon copolymer containing solution.

References Cited
UNITED STATES PATENTS 3,228,936  1/1966  Davis et al. _____ 260—564 X CHARLES B. PARKER, *Primary Examiner.*

REUBEN EPSTEIN, *Examiner.*

L. A. SEBASTIAN, *Assistant Examiner.*